(12) United States Patent
Williams

(10) Patent No.: US 8,672,059 B2
(45) Date of Patent: Mar. 18, 2014

(54) PERMANENT MAGNET DIRECT DRIVE DRAWWORKS

(75) Inventor: Kevin R. Williams, Cypress, TX (US)

(73) Assignee: Canrig Drilling Technology Ltd., Houston, TX (US)

( * ) Notice: Subject to any disclaimer, the term of this patent is extended or adjusted under 35 U.S.C. 154(b) by 214 days.

(21) Appl. No.: 12/643,439

(22) Filed: Dec. 21, 2009

(65) Prior Publication Data

US 2011/0073297 A1    Mar. 31, 2011

Related U.S. Application Data

(60) Provisional application No. 61/140,024, filed on Dec. 22, 2008.

(51) Int. Cl.
*E21B 19/20*    (2006.01)
(52) U.S. Cl.
USPC ........................................................ 175/162
(58) Field of Classification Search
USPC ........... 166/380, 385, 77.1; 175/162, 27, 203; 310/156.01–156.84, 87
See application file for complete search history.

(56) References Cited

U.S. PATENT DOCUMENTS

| | | | | |
|---|---|---|---|---|
| 2,709,284 A | * | 5/1955 | Evans et al. | 164/453 |
| 3,211,803 A | | 10/1965 | Pryor et al. | |
| 3,231,803 A | | 1/1966 | Pryor et al. | |
| 3,653,636 A | | 4/1972 | Burrell | |
| 4,046,355 A | | 9/1977 | Martin | |
| 4,226,311 A | * | 10/1980 | Johnson et al. | 192/223 |
| 4,242,057 A | | 12/1980 | Bender | |
| 4,284,253 A | * | 8/1981 | Uribe | 254/271 |
| 4,314,692 A | * | 2/1982 | Brauer et al. | 254/362 |
| 4,438,904 A | | 3/1984 | White | |
| 4,527,959 A | | 7/1985 | Whiteman | |
| 4,545,017 A | * | 10/1985 | Richardson | 702/9 |
| 4,545,567 A | * | 10/1985 | Telford et al. | 254/344 |
| 4,910,790 A | | 3/1990 | Kerashaw | |
| 5,146,433 A | | 9/1992 | Kosmala et al. | |
| 5,259,731 A | | 11/1993 | Dhindsa et al. | |

(Continued)

FOREIGN PATENT DOCUMENTS

WO    8908941 A1    9/1989
WO    00/76054 A1    12/2000

OTHER PUBLICATIONS

For the American Heritage Dictionary definition: connected. (n.d.) The American Heritage® Dictionary of the English Language, Fourth Edition. (2003). Retrieved Apr. 29, 2013 from http://www.thefreedictionary.com/connected.*

(Continued)

*Primary Examiner* — Shane Bomar
*Assistant Examiner* — Wei Wang
(74) *Attorney, Agent, or Firm* — Adolph Locklar

(57) ABSTRACT

A direct drive drawworks has a permanent magnet motor, a shaft extending from the permanent magnet motor so that the permanent magnet motor directly rotates the shaft, and a drum connected to the shaft away from the permanent magnet motor such that the rotation of the shaft causes a corresponding rotation of the drum. The permanent magnet motor has a housing, a stator positioned in the housing, and a rotor cooperative with the stator. The rotor has a drive plate affixed thereto. The shaft is directly connected to the drive plate. A bearing housing rotatably supports the shaft.

21 Claims, 5 Drawing Sheets

(56) References Cited

U.S. PATENT DOCUMENTS

| | | | |
|---|---|---|---|
| 5,306,124 | A | 4/1994 | Back |
| 5,331,238 | A | 7/1994 | Johnsen |
| 5,351,767 | A | 10/1994 | Stogner et al. |
| 5,375,098 | A | 12/1994 | Malone et al. |
| 5,616,009 | A | 4/1997 | Birdwell |
| 5,952,757 | A | 9/1999 | Boyd |
| 6,029,951 | A | 2/2000 | Guggari |
| 6,094,024 | A | 7/2000 | Westlake |
| 6,182,945 | B1 * | 2/2001 | Dyer et al. ............. 254/340 |
| 6,419,465 | B1 | 7/2002 | Goettel et al. |
| 6,577,483 | B1 | 6/2003 | Steicher et al. |
| 6,995,682 | B1 * | 2/2006 | Chen et al. ............. 340/12.22 |
| 7,462,138 | B2 * | 12/2008 | Shetty et al. ............. 482/69 |
| 7,549,467 | B2 | 6/2009 | McDonald et al. |
| 7,633,248 | B1 | 12/2009 | Williams |
| 7,737,592 | B2 | 6/2010 | Makino et al. |
| 7,851,962 | B1 | 12/2010 | Williams |
| 2002/0121823 | A1 | 9/2002 | Gauthier |
| 2004/0256110 | A1 * | 12/2004 | York et al. ............. 166/379 |
| 2005/0206266 | A1 * | 9/2005 | Hans ............. 310/216 |
| 2006/0017339 | A1 * | 1/2006 | Chordia et al. ............. 310/86 |
| 2006/0049712 | A1 * | 3/2006 | Zepp et al. ............. 310/191 |
| 2006/0108881 | A1 * | 5/2006 | Hauger et al. ............. 310/68 B |
| 2006/0108890 | A1 * | 5/2006 | Hauger et al. ............. 310/214 |
| 2006/0133905 | A1 * | 6/2006 | Woodruff ............. 410/23 |
| 2006/0175064 | A1 * | 8/2006 | Yuratich ............. 166/381 |
| 2006/0181238 | A1 | 8/2006 | Choi et al. |
| 2007/0053780 | A1 * | 3/2007 | Ruffner et al. ............. 417/410.1 |
| 2007/0114856 | A1 * | 5/2007 | Park ............. 310/44 |
| 2007/0228862 | A1 * | 10/2007 | Welchko et al. ......... 310/156.53 |
| 2007/0241627 | A1 * | 10/2007 | Kharsa ............. 310/156.08 |
| 2007/0261888 | A1 | 11/2007 | Urquhart |
| 2007/0267222 | A1 | 11/2007 | Howard, Jr. et al. |
| 2008/0061645 | A1 | 3/2008 | Yukitake |
| 2008/0116432 | A1 | 5/2008 | Folk et al. |
| 2008/0181798 | A1 | 7/2008 | Folk et al. |
| 2008/0203734 | A1 * | 8/2008 | Grimes et al. ............. 290/40 R |
| 2008/0265813 | A1 | 10/2008 | Eschleman et al. |
| 2008/0267785 | A1 * | 10/2008 | Cervenka et al. ............. 417/50 |
| 2011/0295269 | A1 | 12/2011 | Swensgard et al. |
| 2011/0309315 | A1 | 12/2011 | Williams |

OTHER PUBLICATIONS

For the American Heritage Dictionary definition: receiving. (n.d.) The American Heritage® Dictionary of the English Language, Fourth Edition. (2003). Retrieved Apr. 30, 2013 from http://www.thefreedictionary.com/receiving.*

For the American Heritage Dictionary definition: directly. (n.d.) The American Heritage® Dictionary of the English Language, Fourth Edition. (2003). Retrieved Apr. 29, 2013 from http://www.thefreedictionary.com/directly.*

Office Action issued in U.S. Appl. No. 12/876,673 mailed on Oct. 24, 2012 (16 pages).

Office Action for U.S. Appl. No. 12/876,673, mailed on Apr. 5, 2013 (12 pages).

Office Action for U.S. Appl. No. 13/126,319, mailed on Mar. 27, 2013 (7 pages).

Office Action for U.S. Appl. No. 12/629,354, mailed on Apr. 11, 2012 (11 pages).

Office Action for U.S. Appl. No. 12/629,354, mailed on Dec. 31, 2012 (11 pages).

Office Action for U.S. Appl. No. 12/629,354, mailed on Dec. 19, 2011 (11 pages).

International Preliminary Report on Patentability and Written Opinion of The International Searching Authority for International Application No. PCT/US2010/060943, mailed on Jul. 5, 2012 (8 pages).

Extended European Search Report issued in EP10842637.0, dated May 27, 2013 (5 pages).

* cited by examiner

PERMANENT MAGNET DIRECT DRIVE DRAWWORKS

CROSS-REFERENCE TO RELATED U.S. APPLICATIONS

The present application claims priority from prior-filed U.S. Provisional Patent Application Ser. No. 61/140,024, filed on Dec. 22, 2008.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to oil field equipment. More particularly, the present invention the relates to a drawworks used in oil and gas drilling and production. More particularly, the present invention relates to a drawworks having a permanent magnet motor.

2. Description of Related Art Including Information Disclosed Under 37 CFR 1.97 and 37 CFR 1.98.

A drawworks is a common piece of oil field equipment that is used in oil and gas drilling and production. A drawworks is typically mounted near an oil rig. A common function of a drawworks is to raise and lower drillpipe and casing out of and into a wellbore. A drawworks can be referred to as a hoist or a winch. There are many different sizes of drawworks that are used in the drawworks in the drilling and mining industries. The sizes of the drawworks are reflected in the power ratings for such drawworks. These drawworks share similar operating modes and similar equipment.

Drawworks are used in the hoisting and lowering of loads, such as drill pipe, when inserting and extracting the drill pipe into out of the open well. The extraction of the pipe can require extracting in excess of 30,000 feet of pipe in order to change drill bits or tooling during the drilling operation. During typical oil well drilling operations, the drill pipe is often hoisted and lowered many times during these operations.

During mining operations, similar equipment is used in hoisting coal, overburden material, sand and gravel, phosphates and other minerals. These are just a few of the typical operations in which the drawworks are utilized. In mining operations, a bucket is often lowered for the purposes of allowing the loading of the bucket with the materials. After the bucket is loaded, the drawworks are used so as to hoist the loaded bucket to an elevation whereby the bucket is unloaded at a location above the earth.

FIG. 1 shows a conventional drilling rig 10 that utilizes a prior art drawworks 26. The drawworks 26 is mounted to the rig floor 12 within the interior of the oil derrick 11. The drawworks 26 has a wire line 24 extending around the pulley 25 so as to raise and lower drill pipe 14 from and to the wellbore 16. The pulley 25 is also known as a crown block. The wellbore 16 is formed in the earth 50. The drill pipe 14 can be a drillstring that is a series of drill pipes extending within the wellbore 16 in the earth 15. Individual drill pipe 14 is connected to the drillstring at threaded joint 17. Portions of the drillstring may have stabilizer portions that include stabilizer elements 18 that extend helically along the outer surface of the pipe 14 so as to engage the wall of the wellbore 16 in a manner that centers the pipe 14 therein.

The drawworks 26 extends and retracts wire line 24 over the pulley 25 that is mounted on the oil derrick 11 so as to raise and lower the drilling unit 19 that holds the drillpipe 14. The line 24 is connected to traveling block 23. The traveling block 23 is suspended and moved upwardly and downwardly by the line 24 which is extended and retracted by the drawworks 26. The traveling block 23 is connected to the drilling unit 19. The drilling unit 19 has a swivel 22 at its upper end to which drilling fluid is introduced into the drill pipe 14, and by which the drilling unit 19 is suspended from the traveling block 23. The drilling unit 19, pipe handler 21, and the associated connected parts move vertically along axis 20. The vertical movement is guided by two vertical guide rails, or tracks, 27 that are rigidly attached to the derrick 11. The drilling unit 19 is attached to a carriage 28. The carriage 28 has rollers that engage the rails 27. The rails 27 guide the carriage 28 for vertical movement upwardly and downwardly along the rails 27 parallel to vertical axis 20. The drill pipe 14 is inserted into and removed from the wellbore 16 through the wellhead 13.

The drawworks 26 typically has a hollow drum, a shaft that connects the drum to a motor, a transmission positioned between the motor and the drum, and a braking system for slowing the rotation of the drum. The drawworks 26 is mounted on the floor 12 of the drilling rig 10. The longitudinal axis of the drum and shaft is parallel to the drill floor 12. Typical motors used on the drawworks 26 are AC electric motors, DC electric motors, and diesel combustion engines. Power is typically transmitted from the motor to the shaft by a chain transmission mechanism or a gear transmission mechanism. The braking system can use a variety of techniques for braking the drum. The braking system can use disc brakes, band brakes, water-cooled brakes, or electric brakes. As the line 24 is retracted by the drawworks 26, the line 24 is wrapped around the drum of the drawworks 26. The wrapping of the line 24 around the drawworks 26 is similar to wrapping a thread around a spool.

The use of a transmission causes many problems commonly associated with the typical drawworks. A transmission is costly, adds weight to the drawworks, and needs periodic repair. Maintenance of a transmission can be costly especially in the event of a total failure of the transmission. Power is also lost with the use of a transmission due to frictional forces inherent in the use of transmissions. Typical drawworks 26 also use large amounts of energy for changing direction of rotation of the drawworks 26. Thus, there is a need for a simple design of a drawworks that is lighter, easier to maintain, uses less energy, and is more energy efficient.

In the past, various patents have issued relating to drawworks. For example, U.S. Pat. No. 6,182,945, issued on Feb. 6, 2001 to Dyer, et al., discloses a fully redundant drawworks with two complete and totally independent systems for controlling and powering the drum and the drum shaft of the drawworks. Each system has at least one power source, a power transmission, and a coupler connected to the power source and to the transmission and to the drum shaft. Each system has a braking system, such as disc brakes, band brakes, electric brakes, or water-cooled brakes. In the event that any component of either system fails, the fully redundant drawworks has the ability to raise drillpipe from a wellbore so as to avoid the risk of a "stuck" drill pipe.

U.S. Pat. No. 4,226,311, issued on Oct. 7, 1980 to Johnson et al., discloses a disc-type brake apparatus adapted for installation in combination with the drawworks of a wellbore drilling operation. The apparatus automatically senses any reverse torque situation in the drill pipe and quickly sets the brake for precluding transmission of any reverse torque to the rotary table device clutch mechanism therefor.

U.S. Pat. No. 3,653,636, issued on Apr. 4, 1972 to Burrell, discloses a reversible hydraulic motor and a high-pressure/low-pressure hydraulic reservoir system that are used to counterbalance the weight of a drillstring or other well equipment suspended from a line wound on a drawworks positioned on a floating vessel. A load cell controls the torque output and the direction of the output drive of the hydraulic motor. Upon downward movement of the floating vessel, high pressure hydraulic fluid from an accumulator moves through the hydraulic motor into a low pressure hydraulic fluid reservoir to provide increased torque to the drawworks as the drawworks spools a wire line upward. Upon an upward movement of the floating vessel, the hydraulic motor reverses so as to move low pressure fluid from the low pressure reservoir to the high pressure accumulator. This decreases torque and reverses direction to the drawworks as the drawworks extends the line.

U.S. Patent Publication No. 2008/0116432, published on May 22, 2008 to Folk et al., discloses a winch that includes an electric motor having a fixed stator, and a cylindrical rotor which rotates about the stator. A drum is affixed to the rotor and carries a cable which is wound or unwound by the winch. The winch may be a drawworks for an oil rig. The electric motor can be a permanent magnet electric motor. A bearing mechanism is positioned between the motor stator and the motor rotor.

U.S. Pat. No. 3,211,803, issued to Pryor et al., discloses a generator-feed electric drive for a drawworks that has a drawworks, electric motors, a driving connection between the motors and the drawworks, a generator, an electrical connection to the generator and the motors for supplying electricity to the motors, an engine, and a connection between the engine and the generator for supplying power to the generator. The electric motors have a total power absorption capacity that is substantially larger than the power output capacity of the engine, whereby the torque available to drive the drawworks is substantially greater than would be available from motors having a total power absorption capacity equal to the power output capacity of the engine.

U.S. Pat. No. 4,438,904, issued on Mar. 27, 1984 to White, discloses a drawworks that has a drilling platform supporting the drawwork, a cable-drum shaft rotatably supporting the cable drum between two upright support-wall members, an input shaft, a driving mechanism for driving the input shaft in rotation, a clutch-controlled chain sprocket and chain transmission for causing rotation of the drum shaft and the cable drum at any of multiple speeds in response to rotations of the input shaft, and a controller disposed outside of one of the support-wall members. The drum shaft has an extension beyond one of the support-wall members. A single outboard brake is fixed to the drum-shaft extension.

U.S. Pat. No. 6,029,951, issued on Feb. 29, 2000 to Guggari, discloses a system and method for the use of a drawworks where the drawworks has a rotatable drum on which a line is wound. The drawworks and the line are used for facilitating a movement of a load suspended on the line. A drawworks-control system monitors and controls the drawworks. A brake arrangement is connected to the rotatable drum for limiting the rotation of the rotatable drum. An electrical motor is connected to the rotatable drum for driving the rotatable drum. The drawworks control system provides a signal that is representative of the calculated torque value of the electrical motor wherein pre-torquing is generated in the electrical motor in response to the signal. Control of the rotation of the rotatable drum is transferred from the brake arrangement to the electrical motor when the electrical motor pre-torquing level is substantially equal to the calculated torque value.

U.S. Pat. No. 4,046,355, issued on Sep. 6, 1977 to Martin, discloses a control apparatus for use with a drawworks assembly that has a work piece suspended from, and applying tension to, a cable. One end of the cable is wound on a drum. The rotation of the cable is controlled by a power brake mechanism. The control apparatus has a cable tension sensor that produces a tension signal proportional to the tension in the cable. A pulse generator produces a pulsed control signal. A brake control applies the tension signal to the power brake mechanism in response to the control signal.

U.S. Patent Application No. 60/726,077, filed on Oct. 13, 2005 by the present inventor, discloses a drawworks for drilling and mining operations. The drawworks has a wire rope drum which is driven by at least one AC motor. A drive shaft couples a brake with the wire rope drum. The motor is operated from a utility power supply. The drawworks has a flywheel system that stores energy while braking the rotation of the rope wire drum of the drawworks. Energy stored in the flywheel is used to begin another rotation of the wire rope drum.

It is an object of the present invention to provide a direct-drive drawworks.

It is another object of the present invention to provide a drawworks that requires no gearing mechanism.

It is another object of the present invention to provide a drawworks that has a very high power density.

It is another object of the present invention to provide a drawworks that is relatively light weight.

It is still another object of the present invention to provide a drawworks that can be easily transported on conventional road systems.

It is another object of the present invention to provide a drawworks which has minimal assembly requirements in the oil field.

It is another object of the present invention to provide a drawworks that is easily replaceable in the oil field.

It is still another object of the present invention to provide a drawworks that has reduced inertial effects.

It is another object of the present invention to provide a drawworks that reduces costs of operating and repair.

These and other objects and advantages of the present invention will become apparent from a reading of the attached specification and appended claims.

BRIEF SUMMARY OF THE INVENTION

The present invention is a permanent magnet direct drive drawworks comprising a permanent magnet motor, a bearing housing connected to the motor, a shaft connected to the permanent magnet motor and extending through the bearing housing, and a drum connected to the end of the shaft opposite the permanent magnet motor. A braking system is positioned on a side of the drum opposite the motor.

The permanent magnet motor comprises a housing, a stator positioned within the housing, and a rotor cooperative with the stator and positioned interior of the stator within the housing. The rotor is interconnectable with the shaft so that the rotational motion imparted by the permanent magnet motor can be directly imparted to the shaft, and accordingly to the drawworks.

The housing comprises an interior chamber surrounded by a wall. A stator is positioned adjacent to the wall of the housing. The stator has a plurality of windings extending therearound. The windings are maintained in spaced relationship around an inner surface of the stator. The windings extend radially inwardly from the wall of the housing. Suitable air flow passageways are provided throughout the housing so as to enhance the cooling effect of air exchange with the stator.

A rotor is positioned interior of the stator. The rotor is an annular member. Permanent magnets are located in spaced relationship to one another around a periphery of the rotor. The permanent magnets are cooperative with the windings so as to provide the motor-effect of the permanent magnet motor. A drive plate is affixed to the rotor. The drive plate has an interior aperture suitably formed to engage the spline of the associated shaft. The drive plate of the rotor receives the shaft. As such, when rotational forces are imparted to the rotor, the rotational forces are directly imparted to the shaft and to the associated drawworks. As such, the present invention is able to directly rotate the shaft without the need for gearing mechanisms or transmission systems.

The present invention is also a drilling rig. This drilling rig includes a derrick, a pulley supported by the derrick, a wire line extending over the pulley so as to have an end extending downwardly therefrom, a traveling block interconnected to the wire line, a drum positioned adjacent the bottom of the derrick and having the wire line extending around the drum, a shaft connected to the drum extending outwardly therefrom, and a permanent magnet motor receiving the shaft therein. The permanent magnet motor serves to impart a rotational force to the shaft so as to rotate the drum in order to pay in or pay out the wire line.

The permanent magnet motor comprises a housing, a stator positioned in the housing, and rotor cooperative with the stator. The shaft is either connected to or interconnected to the shaft. The stator includes a plurality of windings extending in spaced relation around an interior surface of the stator. The rotor is an annular member having a plurality of magnets mounted in spaced relation around the periphery of the rotor. The rotor has a drive plate affixed thereto. The shaft is directly connected to the drive plate. A bearing housing is connected to the permanent magnet motor. The shaft extends through and is rotatably supported by the bearing housing. A braking means receives the shaft therein. This braking means serves to exert a force on this shaft so as to resist the rotational movement of the shaft.

DETAILED DESCRIPTION OF THE INVENTION

Figure 2:
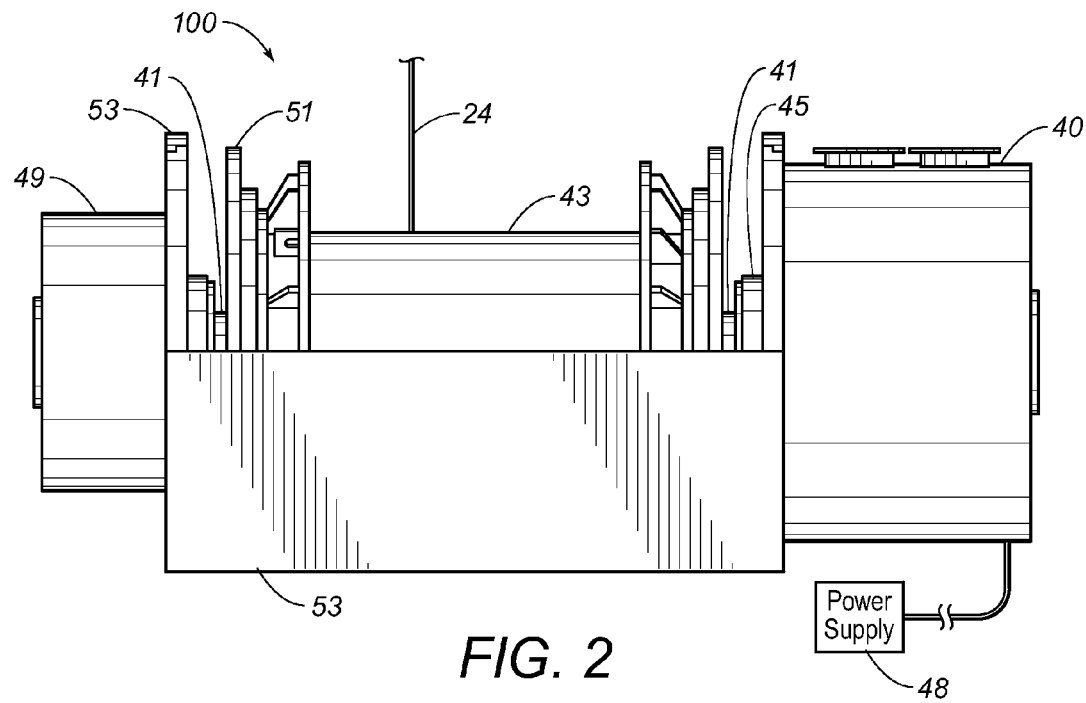
FIG. 2 shows a side elevational view of the preferred embodiment of the permanent magnet direct drive drawworks of the present invention.

Referring to FIG. 2, there is shown a side elevational view of the preferred embodiment of the permanent magnet direct drive drawworks 100 of the present invention. The drawworks 100 has a permanent magnet motor 40. A shaft 41 is connected to the permanent magnet motor 40. A bearing housing 45 is positioned adjacent the permanent magnet motor 40 and the shaft 41. The shaft 41 extends through the bearing housing 45 and into the interior of the motor 40. A drum 43 is attached to the end 47 of the shaft 41 opposite the permanent magnet motor 40. The wire line 24 wraps around the drum 43. The drum 43 is in cradle 53. The cradle 53 supports the shaft 41 so as to hold the drum 43 and motor 40 above the floor surface, e.g. the rig floor 12. A braking system 49 is positioned on a side of the drum 43 opposite the motor 40. In FIG. 2, the braking system 49 has a brake disk 51 positioned adjacent the drum 43. The braking system 49 in FIG. 2 is water-cooled. A power supply 48 is connected to the permanent magnet motor 40 so as to supply power thereto.

The permanent magnet motor 40 rotates the shaft 41 which rotates the drum 43. The rotation of the drum 43 causes the wire line 24 to be extended or retracted depending upon the direction of rotation of the drum 43. When the wire line 24 is retracted, the wire line 24 wraps around the outer surface of the drum 43. A longitudinal axis of the drum 43 is aligned with a longitudinal axis of the shaft 41. The longitudinal axes of the drum 43 and shaft 41 are generally parallel to the rig floor 12.

Figure 3:
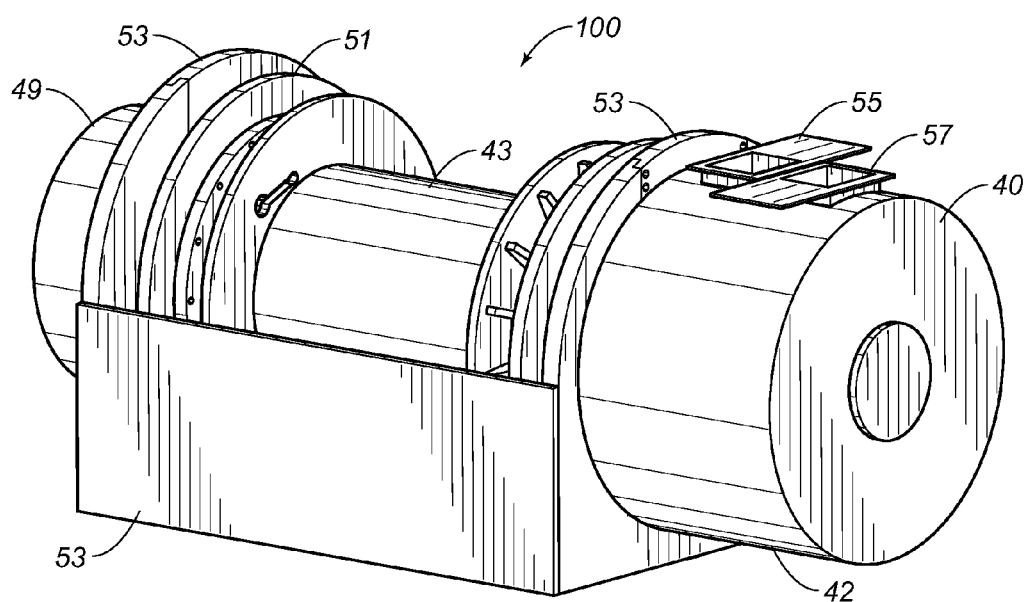
FIG. 3 shows a perspective view of the preferred embodiment of the permanent magnet direct drive of the present invention.

Referring to FIG. 3, there is shown a perspective view of the permanent magnet direct drive drawworks 100 of the present invention. The permanent magnet motor 40 has a housing 42. A rotor and stator are located within the housing 42, as is described in more detailed hereinafter. The housing 42 has a generally cylindrical shape. The housing 42 has an inlet 55 and an outlet 57. In order to cool the rotor and stator of the motor 40, air is passed into the inlet 55, circulated in the interior of the housing 42, and discharged through the outlet 57. A cover 50 is affixed to the top surface 44 of the housing 42. The disk 51 of the braking system 49 is positioned adjacent the drum 43 inside the cradle 53. The drum 43 is shaped like a yarn spool so as to efficiently store long lengths of wire.

Figure 1:
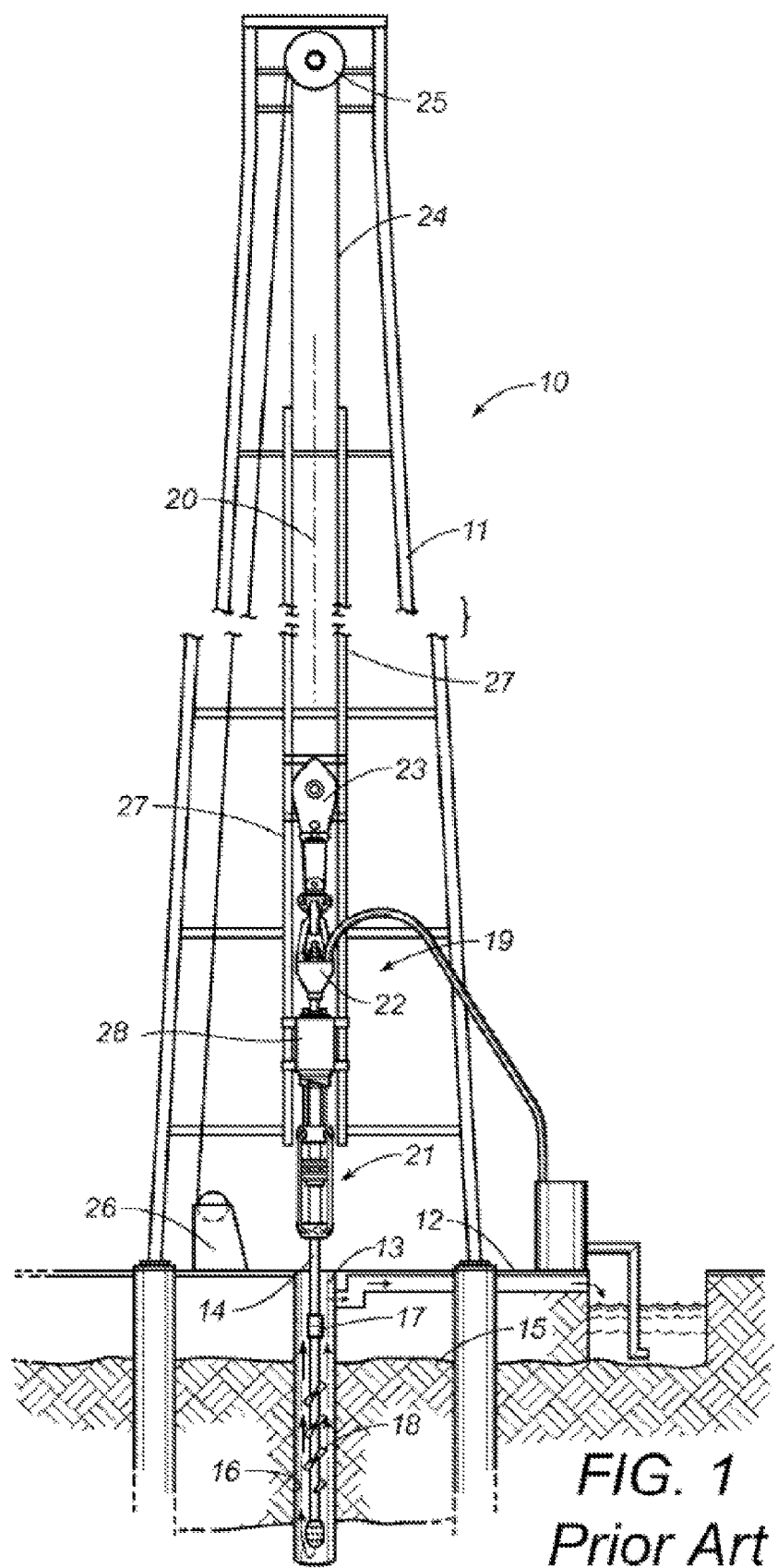
FIG. 1 shows a side elevational view of an oil rig utilizing a prior art drawworks.

The drum 43 has a wire line wrapped therearound. The rotation of the drum 43 serves to pay in and pay out this wire line. The wire line extends from the drum 43 in the manner described herein previously in connection with FIG. 1. As such, the rotation of the drum 43, as caused by the permanent magnet motor 40, can cause the wire line to pay in and pay out for the purpose of lifting or lowering the traveling block.

Figure 4:
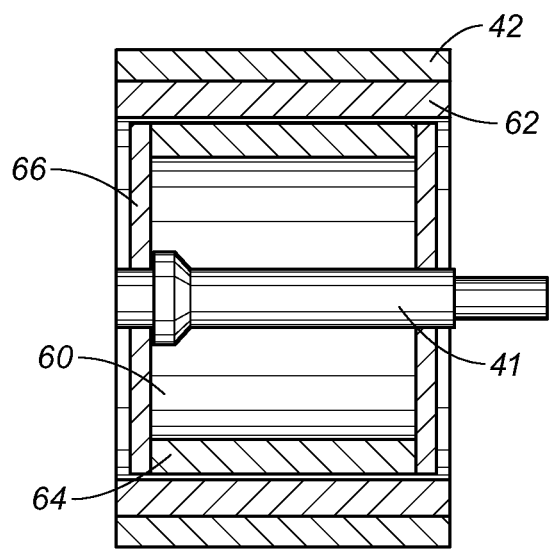
FIG. 4 shows a cross-sectional view of the permanent magnet motor of the present invention.

Referring to FIG. 4, there is shown a cross-sectional view of the housing 42 of the permanent magnet motor 40. As can be seen, the housing 42 defines an interior chamber 60. The shaft 41 extends outwardly of the interior 60 of the housing 42 of the permanent magnet motor 40. A stator 62 is affixed to the wall of the housing 42. The stator 62 extends around the circular interior of the housing 42. A rotor 64 is positioned in close proximity to the stator 62. Rotor 64 has a plurality of permanent magnets formed around a periphery thereof (described in more detail hereinafter). The stator 62 has coils of wire positioned around the inner surface of the stator 62. The interaction of the coils of the stator 62 and the permanent magnets of the rotor 64 provides the rotational power of the permanent magnet motor 40. A drive plate 66 is affixed to the top of the rotor 64. The shaft 41 is engaged with the drive plate 66 so that the rotational energy imparted to drive plate 66 by the rotor 64 will be imparted to the shaft 41. The shaft 41 extends outwardly from the interior chamber 60 of the housing 42. An end of the cradle 53 can be seen as positioned between the bearing housing 45 and the motor 40. Thus, the shaft 41 extends through the motor 40, the cradle 53, and the bearing housing 45.

Permanent magnet motors rotate because of the torque that the interaction of two magnet fields causes. These magnetic fields are created by the permanent magnets mounted on the rotating rotor and the magnetic field that the stationary windings of the stator induce. The torque is greatest when the magnetic vector of the rotor is at 90° to the magnetic vector of the stator. In this position, it forces the poles of the rotor to rotate in the direction of the stator field. In a trapezoidally-driven brushless-DC motor, a current flow alternating sequentially through two of the three coils generates the stator field. The remaining third coil monitors the back EMF (electromotive force) of the two active coils. Back EMF occurs when a permanent magnet motor rotates. Each winding generates a voltage that opposes the main voltage of the windings. Back EMF depends on the angular velocity of the rotor, the magnetic field that the rotor magnets generate, and the number of turns in the stator windings. The motor's back EMF provides the feedback of the rotor's position with respect to the stator windings. Permanent magnet motors having sensors provide a similar position feedback. With sinusoidal commutation, which permanent magnet synchronous motor use, the drive-control circuitry simultaneously powers the three coils.

Permanent magnet motors have been commercially available since the 1990's. However, permanent magnet motors have not seen widespread use because of the high cost associated with the expensive permanent magnets on the rotor. Additionally, their complex control algorithms requires specialized engineering expertise as well as the additional expense of an embedded processor. Permanent magnet motors are more efficient than the AC-induction motors. However, because of the recent rise in the price of copper, the current winding-based induction motors have become more costly and the permanent magnet motors have become comparatively less expensive. Additionally, recent advances in technology have improved the power output of permanent magnet motors to where such motors have a superior power density to that of existing induction motors. As such, the permanent magnet motor 40, as illustrated in FIG. 4, provides superior power output for the direct drive of the shaft 41 and drum 43 of the drawworks 100.

Figure 5:
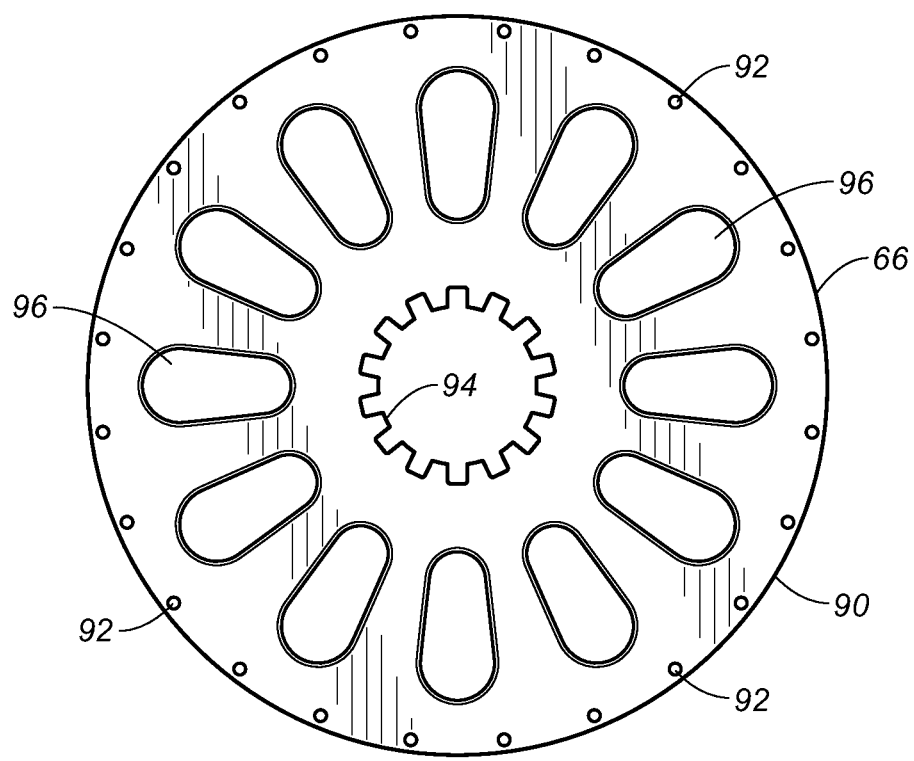
FIG. 5 shows a plan view of the drive plate associated with the permanent magnet motor of the present invention.

Referring to FIG. 5, there is shown a plan view of the drive plate 66 of the permanent magnet motor 40 of the drawworks 100 of the present invention. The drive plate 66 has a circular shape with the an outer periphery 90. Bolt holes 92 are formed adjacent to the outer periphery 90. The bolt holes 92 allow for the bolted attachment of the drive plate 66 of the top of the rotor. A splined aperture 94 is formed centrally of the drive plate 66 so as to accommodate the spline of the shaft 41. Air circulation holes 96 are formed around the interior of the drive plate 66. The holes 96 facilitate air circulation within the permanent magnet motor 40.

Figure 6:
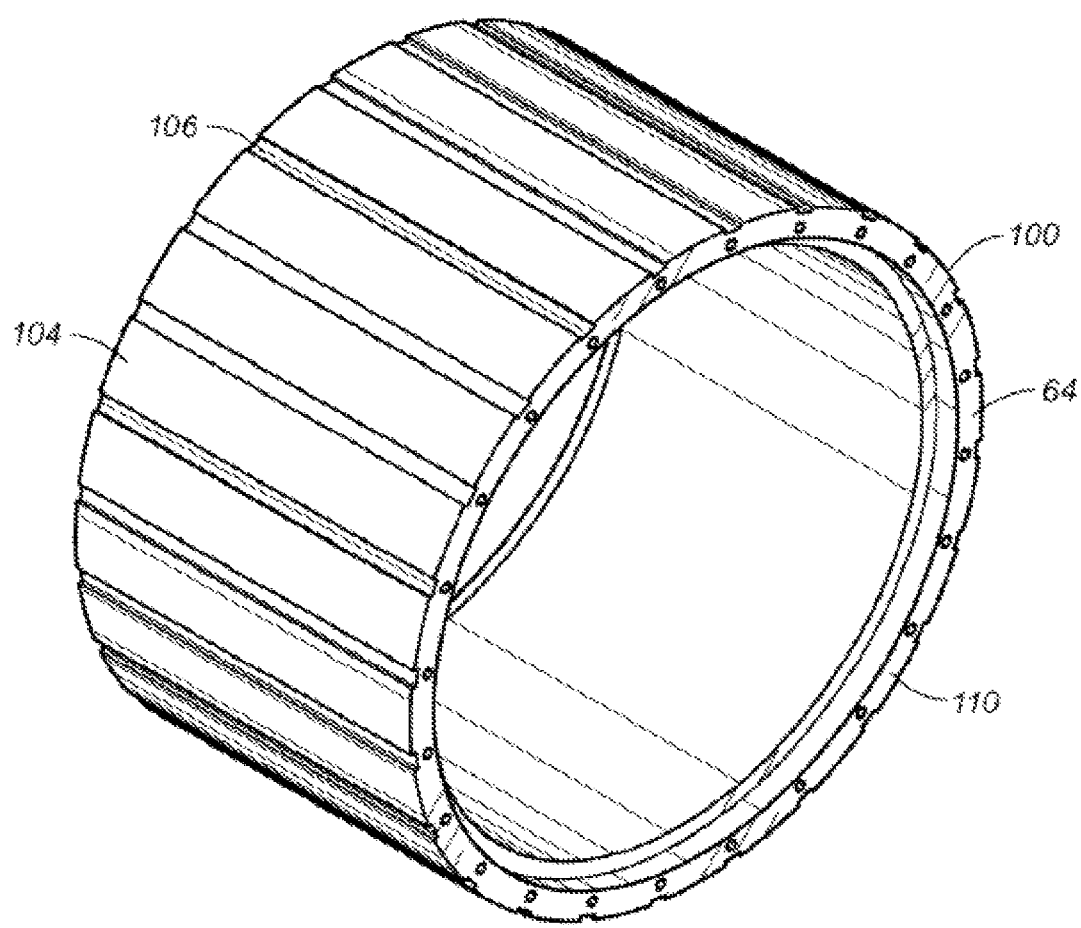
FIG. 6 shows a perspective view of the rotor of the permanent magnet motor of the present invention.

Referring to FIG. 6, there is shown a isolated perspective view of the rotor 64 of the permanent magnet motor 40 of the drawworks 100 of the present invention. The drive plate 66 can be mounted directly onto the top of the rotor 64. Permanent magnet piles are affixed to the outer surface of the rotor 64 in spaced relationship to each other. Spacers 106 serve to isolate one of the permanent magnet piles from an adjacent pile. Spacers 106 can be separate items or they can be simply a formed surface on the outer periphery on the rotor 64. The rotor 64 has a rotor bearing bore 110 formed centrally thereof.

Figure 7:
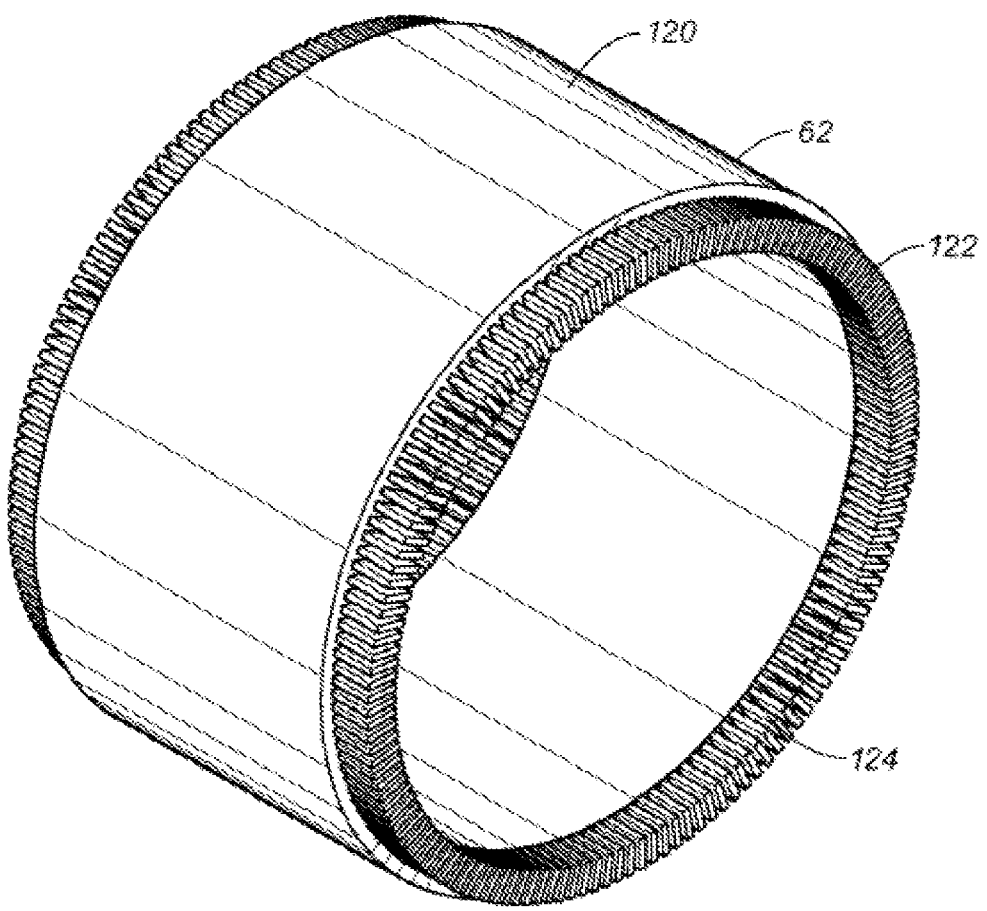
FIG. 7 shows a perspective view of the stator of the permanent magnet motor of the present invention.

Referring to FIG. 7, there is shown a isolated perspective view of the stator 62 of the permanent magnet motor 40 of the drawworks 100 of the present invention. The stator 62 has an outer cover 120 which serves to space the coils 122 from the inner wall of the housing 42. The coils 122 extend radially inwardly therefrom. The interior surface 124 of the coils 122 define a circular aperture into which the rotor 64 is placed. As a result, the permanent magnet piles 104 are in close proximity to the coils 122 so that the permanent magnet motor 40 can operate properly. Suitable electronics are connected to the permanent magnet motor 40 so as to facilitate the proper operation of the permanent magnet motor 40.

In the present invention, it will be appreciated that the permanent magnet direct drive drawworks 100 is directly connected to the shaft 41. As such, there are no gears or other transmission mechanisms that are interconnected in these areas. The drawworks 100 thus provides an enhanced power density for the proper rotation of the drillstring in a relatively lightweight configuration. The weight associated with transmission systems is effectively avoided by the present invention. Furthermore, the complexity of installing such transmission systems so that the power of the induction motor can be transmitted to the drive system is avoided in the present invention. As a result, the permanent magnet direct drive drawworks of the present invention can serve the proper purpose of rotating the drillstring with a minimal weight. Unlike the present motors associated with drilling operations that can weigh in excess of 100,000 pounds, the permanent magnet motor of the present invention will only weigh approximately 60,000 pounds. As such, it can be easily transported over roads on a conventional truck. Unlike the prior art, the motor 40 does not have to be assembled in itself or with the transmission system in the field. As such, the present invention avoids the specialized requirement of installation personnel that would be otherwise required for those systems that require transmissions between the motor and the drawworks. The reduced weight of the permanent magnet motor of the present invention avoids certain inertial effects that would otherwise adversely affect the operation of conventional induction motors. The motor 40 of the present invention can be interchanged, as desired, for use in association with the direct drive top drive of the drilling rig or the mud pump of the drilling rig. Since transmission systems are not required, a supply of such permanent magnet motors can be provided to the drilling operation for use either in association with a drawworks or for other purposes. If there would be a failure of any one motor, then any of the other motors could be substituted therefore without any downtime on the drilling rig.

The foregoing disclosure and description of the invention is illustrative and explanatory thereof. Various changes in the details of the illustrated construction can be made without departing from the true spirit of the invention. The present invention should only be limited by the following claims and their legal equivalents.

I claim:
1. A direct drive drawworks, comprising:
   a permanent magnet motor;
   a single shaft extending from said permanent magnet motor such that said permanent magnet motor directly rotates said single shaft;

a drum connected to said single shaft away from said permanent magnet motor such that the rotation of said single shaft by said motor causes a corresponding rotation of said drum;
a cable extending around said drum; and
a traveling block interconnected to an end of said cable.

2. The direct drive drawworks of claim 1, said permanent magnet motor comprising:
a housing;
a stator positioned in said housing; and
a rotor cooperative with said stator, said rotor being either connected to or interconnected to said single shaft.

3. The direct drive drawworks of claim 2, said housing having an interior chamber surrounded by a wall, said stator positioned adjacent said wall, said rotor positioned interior of said stator.

4. The direct drive drawworks of claim 3, said stator having a plurality of windings extending in spaced relation around an interior surface of said stator, said rotor being an annular member having a plurality of permanent magnets mounted in spaced relation around a periphery of said rotor.

5. The direct drive drawworks of claim 4, said plurality of windings extending radially inwardly toward said rotor, said plurality of windings acting on said plurality of permanent magnets so as to cause a rotation of said rotor.

6. The direct drive drawworks of claim 2, said rotor having a drive plate affixed thereto, said single shaft being directly connected to said drive plate.

7. The direct drive drawworks of claim 6, said drive plate having an aperture centrally formed therein, said drive plate having splines extending inwardly into said aperture, said single shaft having a splined end engaged with said splines of said drive plate.

8. The direct drive drawworks of claim 1, further comprising: a bearing housing connected to said permanent magnet motor, said single shaft extending through and rotatably supported by said bearing housing.

9. The direct drive drawworks of claim 8, said bearing housing interposed between said permanent magnet motor and said drum.

10. The direct drive drawworks of claim 1, further comprising: a braking system receiving said single shaft therein.

11. The direct drive drawworks of claim 10, said braking system positioned adjacent an end of said drum opposite said permanent magnet motor.

12. The direct drive drawworks of claim 1, further comprising: a power supply electrically connected to said permanent magnet motor so as to supply electrical energy thereto.

13. The direct drive drawworks of claim 1, wherein said drum is rotatable so as to pay in and pay out said cable.

14. A drilling rig, comprising:
a derrick;
a pulley supported by said derrick;
a cable extending over said pulley so as to have an end extending downwardly therefrom;
a traveling block interconnected to said end of said cable;
a drum positioned adjacent a bottom of said derrick, said cable extending around said drum;
a single shaft connected to said drum and extending outwardly therefrom; and
a permanent magnet motor receiving said single shaft therein, said permanent magnet motor for imparting a rotational force to said single shaft so as to rotate said drum in order to pay in or pay out said cable.

15. The drilling rig of claim 14, said permanent magnet motor comprising:
a housing;
a stator positioned in said housing; and
a rotor cooperative with said stator, said rotor being either connected to or interconnected to said single shaft.

16. The drilling rig of claim 15, said stator having a plurality of windings extending in spaced relation around an interior surface of said stator, said rotor being an annular member and having a plurality of permanent magnets mounted in spaced relation around a periphery of said rotor.

17. The drilling rig of claim 16, said rotor having a drive plate affixed thereto, said single shaft being directly connected to said drive plate.

18. The drilling rig of claim 14, further comprising: a bearing housing connected to said permanent magnet motor, said single shaft extending through and rotatably supported by said bearing housing.

19. The drilling rig of claim 14, further comprising: a braking system receiving said single shaft therein.

20. A direct drive drawworks, comprising:
a permanent magnet motor, wherein said permanent magnet motor comprises:
a housing;
a stator positioned in said housing; and
a rotor cooperative with said stator, said rotor being either connected to or interconnected to a single shaft, wherein said single shaft extends from said permanent magnet motor such that said permanent magnet motor directly rotates said single shaft and wherein said rotor has a drive plate affixed thereto, said single shaft being directly connected to said drive plate;
a power supply electrically connected to said permanent magnet motor so as to supply electrical energy thereto;
a drum connected to said single shaft away from said permanent magnet motor such that the rotation of said single shaft causes a corresponding rotation of said drum;
a braking system positioned adjacent an end of said drum opposite said permanent magnet motor and receiving said single shaft therein; and
a cable extending around said drum and interconnected to a traveling block.

21. An apparatus, comprising:
a drawworks to controllably raise and lower a traveling block, wherein said traveling block is at least indirectly connected to a drilling rig top drive, and wherein said drawworks comprises:
an electrically driven permanent magnet motor comprising a rotor and stator cooperative to rotate a single shaft that is at least indirectly coupled to said rotor;
a drum directly rotatable with said rotor via said single shaft;
a braking system receiving said single shaft therein; and
a cable at least indirectly interconnecting said drum and said traveling block.

* * * * *

UNITED STATES PATENT AND TRADEMARK OFFICE
Certificate

Patent No. 8,672,059 B2  Patented: March 18, 2014

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Kevin R. Williams, Cypress, TX (US) and Charles Patrick, Houston, TX (US).

Signed and Sealed this Twenty-second Day of July 2014.

T. SHANE BOMAR
*Supervisory Patent Examiner*
Art Unit 3676
Technology Center 3600